(12) United States Patent
Butka et al.

(10) Patent No.: US 6,433,329 B1
(45) Date of Patent: Aug. 13, 2002

(54) OPTICAL POSITION SENSOR WITH THRESHOLD UPDATED DYNAMICALLY BY INTERPOLATION BETWEEN MINIMUM AND MAXIMUM LEVELS OF OUTPUT SIGNAL

(75) Inventors: David Butka; Brian Gerard Goodman; Michael Philip McIntosh; Raymond Yardy, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/772,831

(22) Filed: Jan. 30, 2001

(51) Int. Cl.[7] ................................................ H01J 40/14
(52) U.S. Cl. .................................... 250/221; 250/559.1
(58) Field of Search ........................... 250/221, 222.1, 250/223 B, 223 R, 559.1, 214 R, 214.1; 356/240, 429–430; 340/555–557

(56) References Cited

U.S. PATENT DOCUMENTS

| | | | |
|---|---|---|---|
| 4,393,373 A | * | 7/1983 | Wiggins .................. 250/223 B |
| 5,496,996 A | * | 3/1996 | Barnes et al. ............. 250/223 B |
| 5,608,207 A | * | 3/1997 | Allen et al. ............. 250/214 AG |
| 5,710,578 A | | 1/1998 | Beauregard .................. 345/429 |
| 5,739,524 A | | 4/1998 | Fally ....................... 250/227.11 |
| 5,898,170 A | | 4/1999 | Featherston et al. ... 250/231.18 |
| 6,038,490 A | | 3/2000 | Dimitri et al. ............... 700/214 |
| 6,041,026 A | | 3/2000 | Hammar et al. ............... 369/36 |
| 6,101,057 A | | 8/2000 | Kartchner et al. ............ 360/69 |

* cited by examiner

Primary Examiner—Que T. Le
(74) Attorney, Agent, or Firm—Antonio R. Durando; Durando Birdwell & Janke, P.L.C.

(57) ABSTRACT

The detection threshold of an optical sensor is dynamically calibrated by measuring the maximum and minimum levels of the analog output produced by the sensor's light detector and setting the detection threshold of the sensor at an intermediate level between the two. The new detection threshold thus established is then used as the voltage reference that determines the logic state of the system. The invention may be implemented using analog-to-digital converter hardware already embedded in the system. Alternatively, the invention may be implemented using digital-to-analog converter hardware that may also be already present in the system.

27 Claims, 9 Drawing Sheets

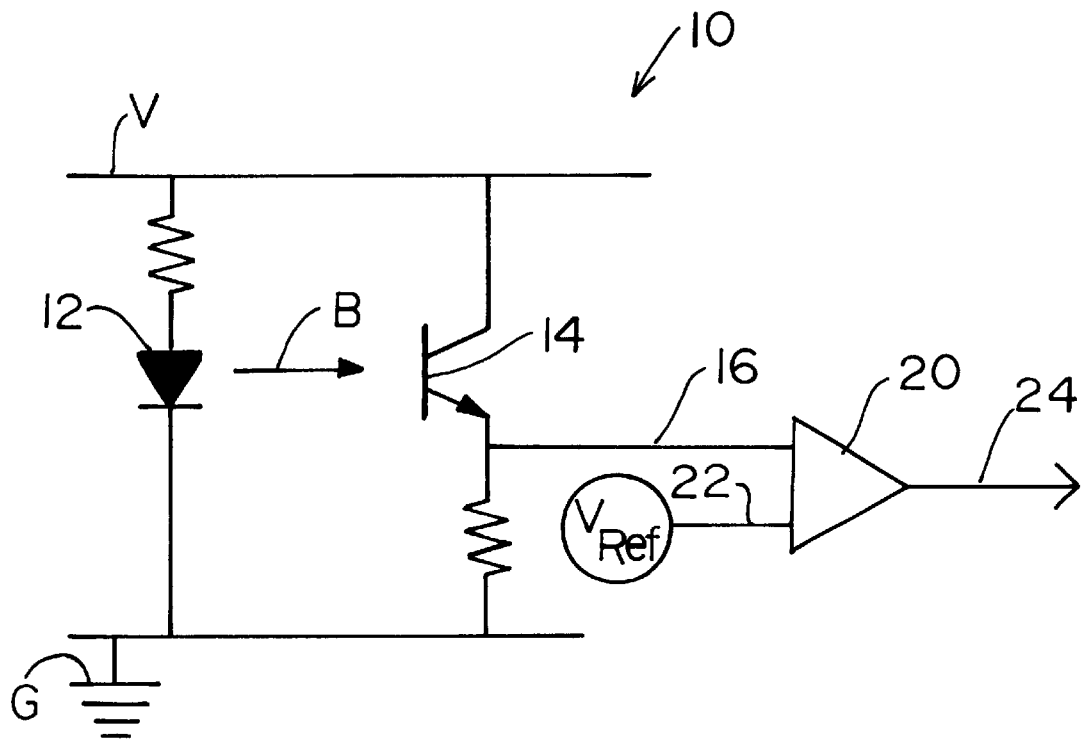
FIG. IA (PRIOR ART)
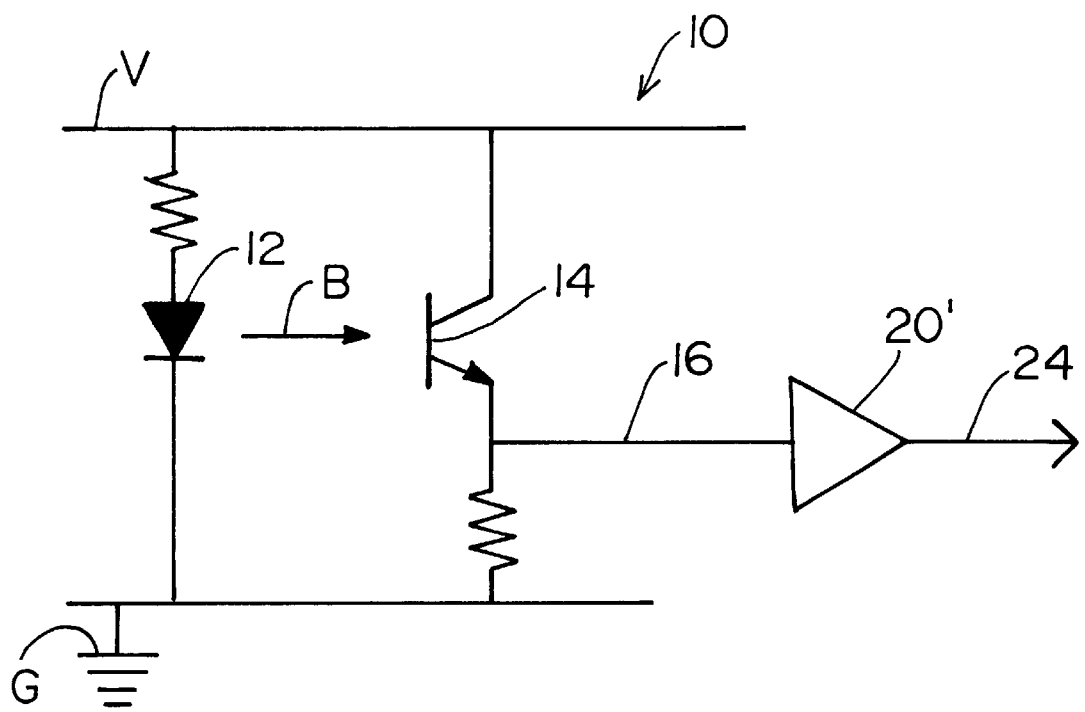
FIG. IB (PRIOR ART)

OPTICAL POSITION SENSOR WITH THRESHOLD UPDATED DYNAMICALLY BY INTERPOLATION BETWEEN MINIMUM AND MAXIMUM LEVELS OF OUTPUT SIGNAL

BACKGROUND OF THE INVENTION

1. Field of the Invention

This invention relates generally to methods and apparatus for sensing the position of a moving part. In particular, the invention relates to a dynamically tracking threshold for maintaining the reliability of an optical sensor.

2. Description of the Related Art

Position sensors are typically used in machines to monitor the physical state of a moving mechanical component of an automated system. For example, the exact position of a moving part may need to be determined to establish an "on" or "off" control signal for mechanical applications, such as an end stop or travel limit for an X- or Y-motor to move a cartridge gripper of a robotic system loading and unloading magnetic tapes into and from a tape drive or cartridge cell. In such applications, the position sensor determines when the tape cartridge has reached the desired physical location within the tape drive (or the cartridge cell) and the sensor's output is used both to stop the gripper motor and to trigger the next operation step within the functional logic of the system. For instance, the tape cartridge's advance is stopped and data stored in the tape are accessed by a computer.

Motion detectors used in the prior art to monitor mechanical motion typically consist of mechanical switches and/or optical sensors. Both types of devices require periodic maintenance or replacement to preserve the desired level of reliability. As one skilled in the art would readily appreciate, mechanical switches include moving parts and are prone to contact bounce and malfunction due to early life failure of any moving part in the switch.

Optical sensors, which consist of light sources and detectors, are often utilized to overcome these problems, but they are also susceptible to failures caused by problems inherent in the nature of their components. For example, optical sensors tend to become unreliable as a result of large changes in ambient light, misalignments between the light source and the detector, reduced light levels caused by dirt or debris accumulation, reduced light levels caused by the aging of the internal light sources, and manufacturing differences in sensitivity between devices. Thus, even though optical sensors are more immune than mechanical switches to mechanical noise and failure, their reliability remains uncertain under normal operating conditions.

The operation of an optical sensor is based on detecting the intensity of a light beam emitted by a light source (such as a light emitting diode, "LED") with a light detector (such as a phototransistor, "PTR") aligned with the optical path of the beam. One detection approach, often referred to in the art as "through-beam," involves a first normal state wherein the light is received by the detector at a relatively high intensity level directly from the source. A change of state is established when the light beam is blocked in its optical path toward the detector by a moving part, thereby causing the intensity measured at the detector to vary to a relatively lower value. Another approach, often referred to as "reflective," involves a first normal state wherein the light is directed away from the detector, which correspondingly measures a relatively low intensity level. A change of state is established when the light beam is reflected toward the detector by the moving part, thereby causing the intensity measured at the detector to vary to a relatively higher value. In either system, the accuracy of the operation of the detector is predicated upon its ability to correctly determine when a change of state has occurred as a result of the present location of the moving part.

A typical through-beam embodiment 10 of optical-sensor apparatus is illustrated in FIGS. 1A and 1B (prior art). An LED 12, appropriately grounded through a system ground G, is energized by a source voltage V to produce a light beam B. The beam is aimed, either directly or by reflection, at a PTR 14 that produces an analog output 16 which is a function of the intensity of the light beam B, as illustrated in FIG. 2. When a moving part crosses the path of the light beam B, it interrupts its normal path toward the detector 14 and correspondingly causes a significant drop in its output. Thus, the peak 18 of the analog amplitude curve 16 illustrated in FIG. 2 (prior art) corresponds to a minimum amount of light being blocked by the moving part and a maximum amount of light being received by the detector 14. Conversely, the low value of the amplitude curve corresponds to a maximum amount of light being blocked by the moving part and a minimum amount of light being received by the detector 14.

The output 16 of the detector 14 is typically used as the input to a comparator 20 (FIG. 1A) or a logic gate, such as a Schmitt trigger 20' (FIG. 1B). As illustrated in FIG. 3A (prior art), an arbitrarily fixed detection threshold 22 is used to create a digital logic signal 24 that corresponds to the analog output 16 of the optical sensor. The resulting digital logic signal 24 changes state when the sensor's analog output 16 crosses the threshold level 22, as shown in FIGS. 3A and 3B (prior art).

When a sufficiently large decrease occurs in the ability of the detector 14 to sense the light emitted by the LED, a total loss of detection may result if the peak 18 of the output 16 remains below the detection threshold 22, as illustrated in FIG. 4A (prior art). Correspondingly, the digital logic signal 24 becomes inoperably fixed at a single "low" or "0" logic state, as shown in FIG. 4B. This condition can result, for example, from partial blockage of the light source 12 or the detector 14 caused by debris accumulation, from a decrease in the output characteristics of the light source, or from a change in the alignment of the detector 14 with respect to the light source 12. In a reflective embodiment of optical-sensor apparatus (not illustrated in the figures), this problem can similarly result from a decrease in the reflectivity of the moving target.

Similar problems can arise when an increase in the light sensed by the detector 14 occurs to the point where the minimum amplitude 26 of the detector output 16 is always higher than the threshold 22, as illustrated in FIG. 5A, This can happen, for example, when the ambient or background light is too high, or when the light source 12 is supplied with too much current that yields a greater than rated light beam B. In a reflective embodiment, this problem can result from an increase in ambient reflectivity. In any of these cases, the digital logic signal 24 becomes inoperably fixed at a single "high" or "1" logic state, as shown in FIG. 5B.

In view of the foregoing, it is clear that the conventional fixed detection threshold used with prior-art optical sensors is inadequate to provide maintenance-free, reliable, long-term service under variable operating conditions. Some approaches have been disclosed in U.S. Pat. Nos. 5,898,170 and 5,739,524 to improve similar problems, but they are limited to specific optical-sensor applications. Accordingly, there is still a need for an improved approach of general application to setting the detection-threshold level of an optical sensor such that it reliably determines the logical state of the sensors under variable operating conditions.

BRIEF SUMMARY OF THE INVENTION

The primary, general objective of this invention is a method and apparatus for reducing failures associated with optical sensors in automated systems, thereby reducing downtime, maintenance and repair costs.

Another objective of the invention is a method and apparatus that provide dynamically a detection threshold that is always bound by the maximum and minimum levels of the sensor output signal, so as to produce a correspondingly consistent digital logic signal.

Another goal is an invention that is suitable for relatively simple incorporation within existing robotic equipment.

Still another goal is a method and apparatus that can be carried out while advantageously using hardware already present in the automated system.

A final objective is an approach that can be implemented easily and economically according to the above stated criteria.

Therefore, according to these and other objectives, the invention consists of dynamically calibrating the optical sensor by measuring the maximum and minimum levels of the analog output produced by the light detector and setting the detection threshold of the sensor at an intermediate level between the two. For example, the new threshold may be set at a level halfway between the minimum and maximum output produced by the detector. The new detection threshold thus established is used currently as the voltage level (or current level, depending on the variable being monitored) that yields a change in the digital logic signal that determines the "high" or "low" state of the sensor.

The invention may be implemented through firmware control using analog-to-digital converter (ADC) hardware already embedded in the system. The analog output from the light detector is measured and converted to a digital signal that represents the magnitude of the analog signal (voltage or current). The digital signal is then compared through microprocessor firmware to the present detection threshold to determine the logic state of the optical sensor. The sensor is calibrated by reading the analog level when the optical path of the light beam is both open and blocked. A new detection threshold is then established by interpolation between the two measurements so generated and the detection threshold value stored by firmware is updated accordingly. Thus, the firmware dynamically compensates for any changes in the analog output characteristics of the sensor.

Alternatively, the invention may be implemented using digital-to-analog converter (DAC) hardware that may also be already present in the system. In this case, the fixed threshold is replaced with a DAC output under firmware control. The analog output from the optical detector is compared to the analog signal produced by the DAC to yield a digital signal that represents the logic state of the optical sensor. The sensor is calibrated by changing the output of the DAC through firmware control to determine the analog values that match the detector's analog output when the optical path of the light beam is both open and blocked. A new detection threshold level is then established by interpolation between the two measurements so generated and the old detection threshold stored by firmware is updated accordingly. Thus, the firmware of the system again dynamically compensates for any changes in the analog output characteristics of the sensor.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 1A is a schematic representation of a typical prior-art through-beam embodiment of an optical motion sensor.

FIG. 1B is a schematic representation of an alternative prior-art through-beam embodiment of an optical motion sensor.

DESCRIPTION OF THE PREFERRED EMBODIMENTS OF THE INVENTION

The heart of this invention lies in the idea of dynamically varying the detection threshold of an optical sensor by judiciously setting it between the extreme values of the analog output of the light detector. This variable threshold compensates for changes in the analog output characteristics of the sensor and guarantees that a two-state condition is preserved in the digital logic output of the optical sensor.

Figure 2:
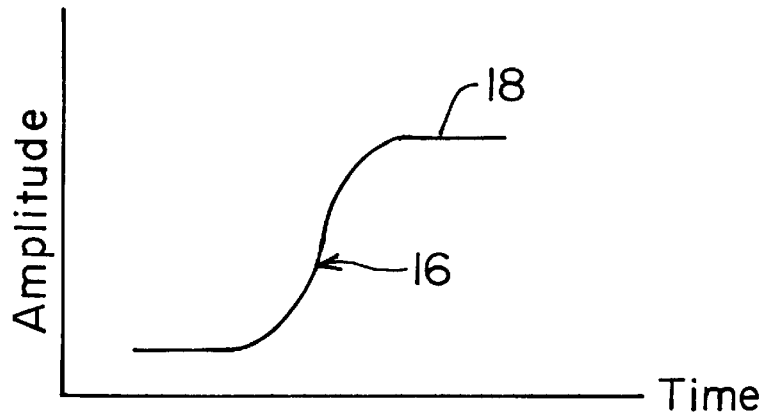
FIG. 2 is an amplitude-versus-time graph illustrating the typical analog output of the light detector of an optical sensor under normal operating conditions.
Figure 3A:
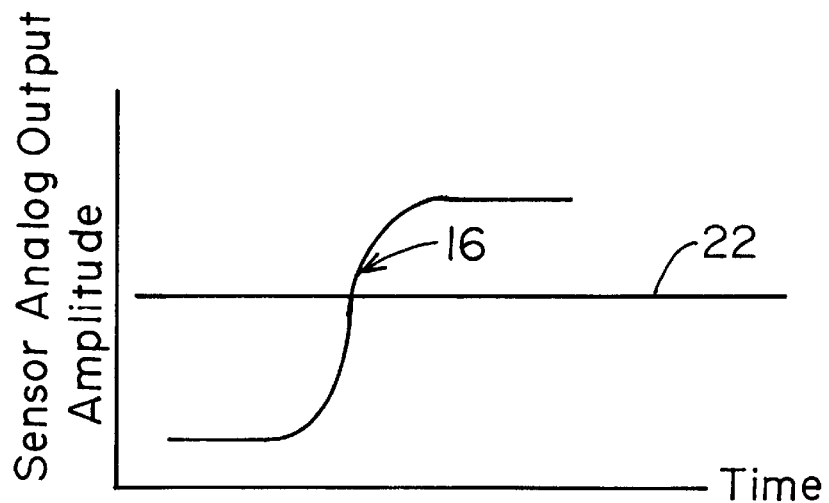
FIG. 3A illustrates a prior-art fixed detection threshold set between the maximum and minimum values expected to be reached by the analog output of the light detector of a motion sensor device under the normal operating conditions of FIG. 2.
Figure 3B:
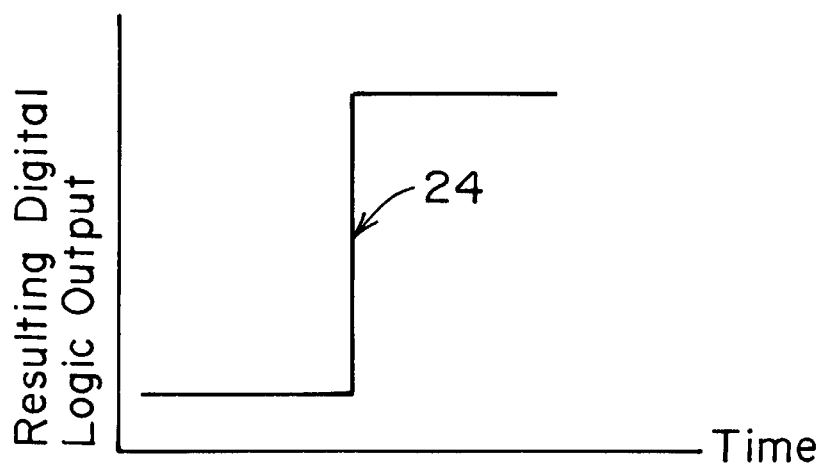
FIG. 3B shows the digital logic output resulting from the threshold level illustrated in FIG. 3A.
Figure 4A:
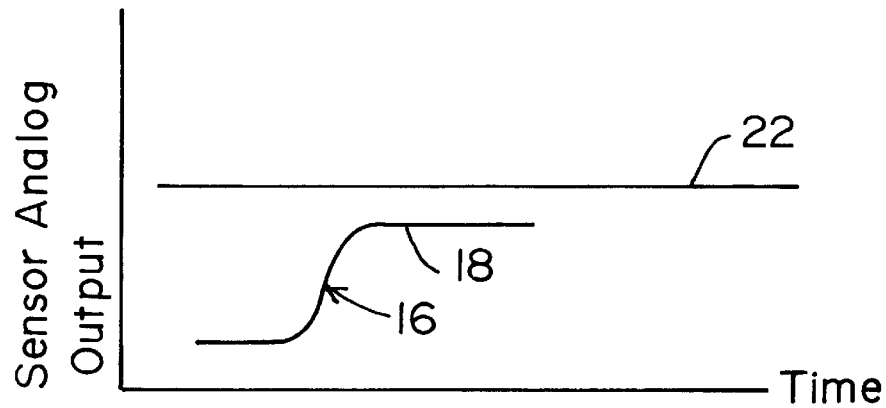
FIG. 4A is an amplitude-versus-time graph illustrating the typical analog output of the light detector of an optical sensor when the intensity of the light received is reduced by misalignment, blockage, or equivalent change of operating conditions.
Figure 4B:
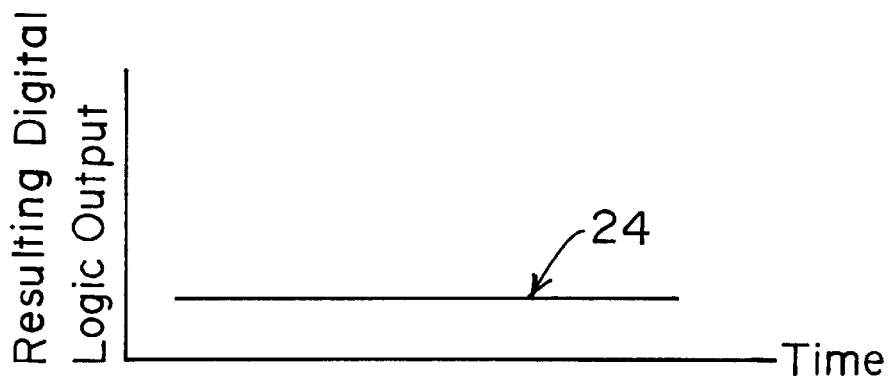
FIG. 4B shows the digital logic output resulting from the use of the conventional threshold level illustrated in FIG. 4A.
Figure 5A:
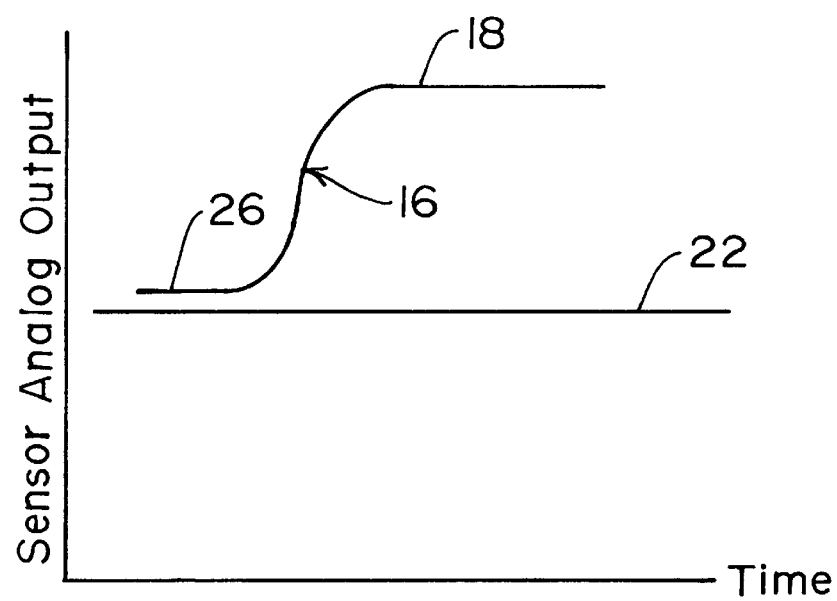
FIG. 5A is an amplitude-versus-time graph illustrating the typical analog output of the light detector of an optical sensor when the intensity of the light received is increased by ambient light, higher current applied to the light source, or equivalent change of operating conditions.
Figure 5B:
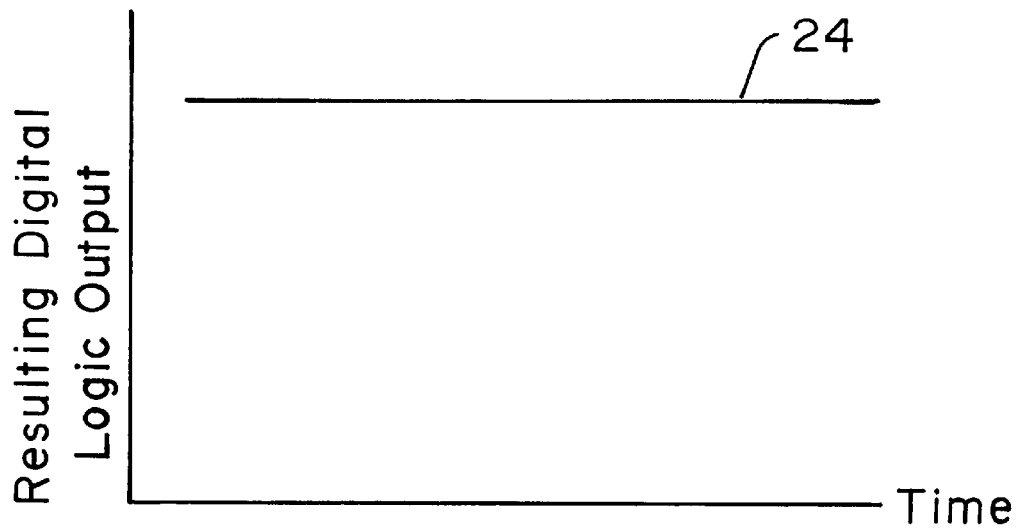
FIG. 5B shows the digital logic output resulting from the use of the conventional threshold level illustrated in FIG. 5A.
Figure 6:
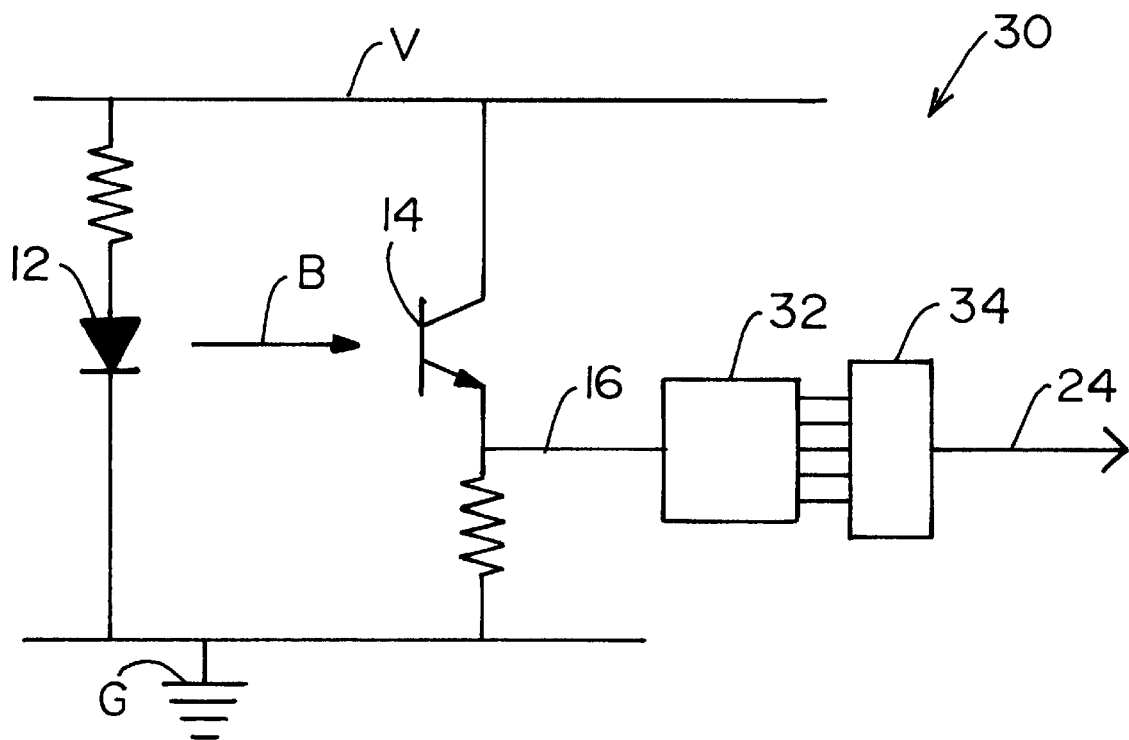
FIG. 6 illustrates an ADC embodiment of the invention, wherein the analog output (voltage or current) of the light detector of an optical sensor is fed to an analog-to-digital converter.

Referring to the drawings, wherein like parts are designated throughout with like numerals and symbols, FIG. 6 illustrates an ADC embodiment 30 of the invention, wherein the analog output 16 from the light detector 14 of an optical sensor is fed to an analog-to-digital converter 32 to produce a digital binary number that represents the magnitude of the analog signal 16 (voltage or current). This embodiment is preferably used in systems that include a microprocessor that contains the ADC function. Thus, the digital value of the light-detector signal produced by the ADC 32 is used by the microprocessor 34 to update the detection threshold according to the invention and to determine the present state of the optical sensor ("high" or "low").

Figure 7:
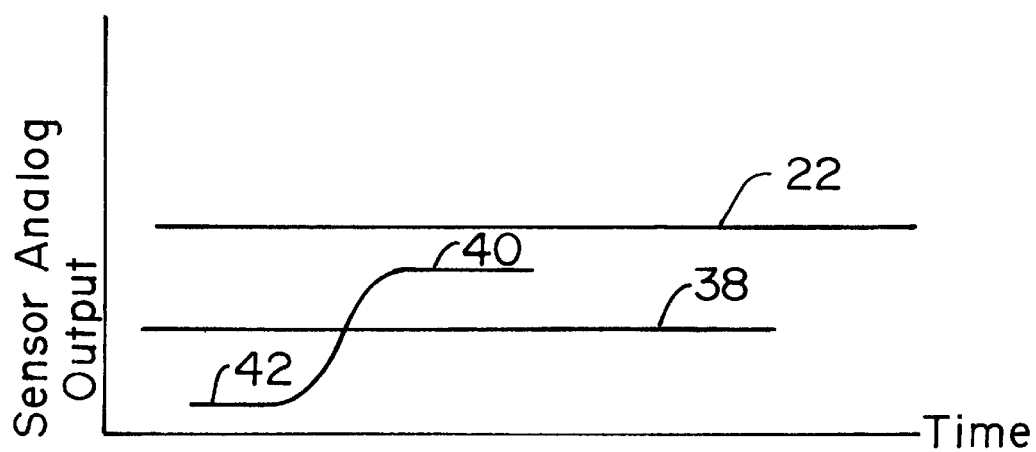
FIG. 7 illustrates a dynamic detection threshold set according to the process of the invention between the measured maximum and minimum values of the analog output of the light detector of an optical sensor.

During the calibration process of the invention, the digital values corresponding to analog outputs 16 when the optical path of the light beam B is both open and blocked are recorded by the processor 34 through firmware operations and a new detection threshold is calculated by interpolation between the two measurements so generated. For example, a detection threshold 38 set midway between the high and low outputs 40,42 currently measured from the light detector, as illustrated in FIG. 7, has been found to be suitable for general application. Different interpolation schemes may, of course, be more suitable for particular applications. The new detection threshold is then stored by firmware to update the old value for optical-sensor operation. Thus, the firmware of the system is utilized to dynamically compensate for any changes in the output characteristics of the optical sensor. The same microprocessor 34 is also utilized to compare the digital value of the light-detector output 16 to the detector threshold stored by firmware to determine the logical state of the optical sensor, which may additionally be provided as an output signal 24 (FIG. 6).

It is noted that the calibration of the optical sensor could be carried out at every cycle of operation; that is, at every mechanical cycle of the moving part that repeatedly blocks or reflects the light beam B emitted by the light source 12 of the optical sensor. Equivalently, a new detection threshold could be set less frequently according to the particular needs and functions of the system, such as, for instance, whenever the system is turned on. A common operation in automation systems is a process called "re-zero," where the home position of robotic components is calibrated to a known reference point. Optical sensors are commonly used in such re-zero operations; therefore, it would be appropriate to also incorporate a dynamic recalibration of the optical sensor as part of the operation.

Figure 8:
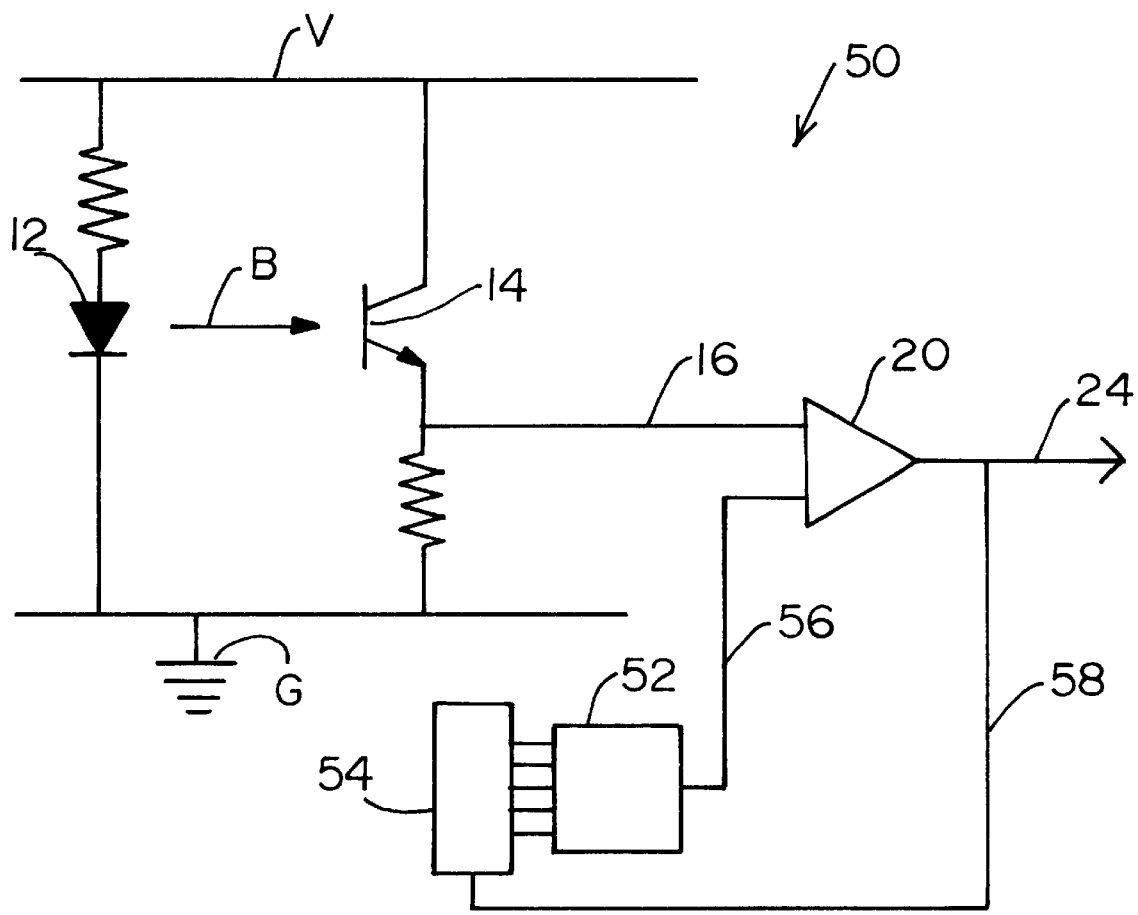
FIG. 8 illustrates a DAC embodiment of the invention, wherein the analog output (voltage or current) of the light detector of an optical sensor is fed to a comparator using a reference signal produced by an embedded microprocessor and a digital-to-analog converter.

In an alternative embodiment of the invention, which may be preferred when a digital-to-analog converter (DAC) is available in the system or when a direct logic output is required from the sensor, a DAC is used to set a comparator reference threshold for the optical sensor. In this embodiment 50 of the invention, illustrated in FIG. 8, the fixed threshold 22 of the prior art (FIG. 1A) is replaced with the variable output of a DAC 52 under firmware control of a microprocessor 54. The analog output 16 from the light detector 14 is compared in a comparator 20 to the analog signal 56 produced by the DAC 52 to yield a digital signal 24 that represents the logic state of the optical sensor.

In order to perform the calibration function of the invention, the microprocessor 54 is programmed to vary the DAC's analog output systematically through a range of values designed to span through the minimum and maximum amplitude values of the output 16 of the light detector 14. The calibration is carried out by storing the DAC values that cause a logic transition in the comparator 20 when the optical path of the light beam B is both open (maximum light) and blocked (minimum light). The two DAC values so produced are then used by the microprocessor 54 to calculate by interpolation a new, dynamic detection threshold in a manner similar to the use of the two ADC values produced by the embodiment 30 of the invention described above. The new detection threshold so calculated is then used to update the value of the detection threshold stored in the microprocessor 54, which is used as the reference signal 56 fed to the comparator 20 to determine the present state of the optical sensor. As one skilled in the art would readily understand, the output 24 of the comparator 20 is fed back to the microprocessor 54 through a feedback loop 58 to provide the signal required to establish the maximum and minimum light-detector output during calibration.

Thus, the approach of the invention enables the dynamic updating of the detection threshold of an optical sensor to a value that substantially ensures the continued functional operation of the sensor. The invention also permits the use of programmable alternative threshold levels to account for different sensor responses caused by hysteresis effects in the output of the detector. The invention permits the use of programmable threshold levels that are different for a high-to-low transition than for a low-to-high transition of the detector output. Such different thresholds permit the implementation of a programmable hysteresis effect, which is useful for suppressing oscillations in the state of the sensor output determined during transitions.

Moreover, the invention provides diagnostic flexibility that is not available with prior-art sensors. For example, the maximum and minimum detector-signal values measured to update the detection threshold could be monitored by firmware to signal a trend toward sensor failure. When the difference between the two values reaches a predetermined low number, for example, a message could be sent to an operator to have the sensor cleaned, aligned, or otherwise serviced. Such an approach would make it possible to identify and correct a problem before failure of the system occurs. This is critical for systems that require high availability because normal operation can continue under circumstances that would typically bring the system down for maintenance or repair. Accordingly, this invention is expected to increase the useful life of optical sensors, reduce maintenance costs, and reduce downtime.

Figure 9:
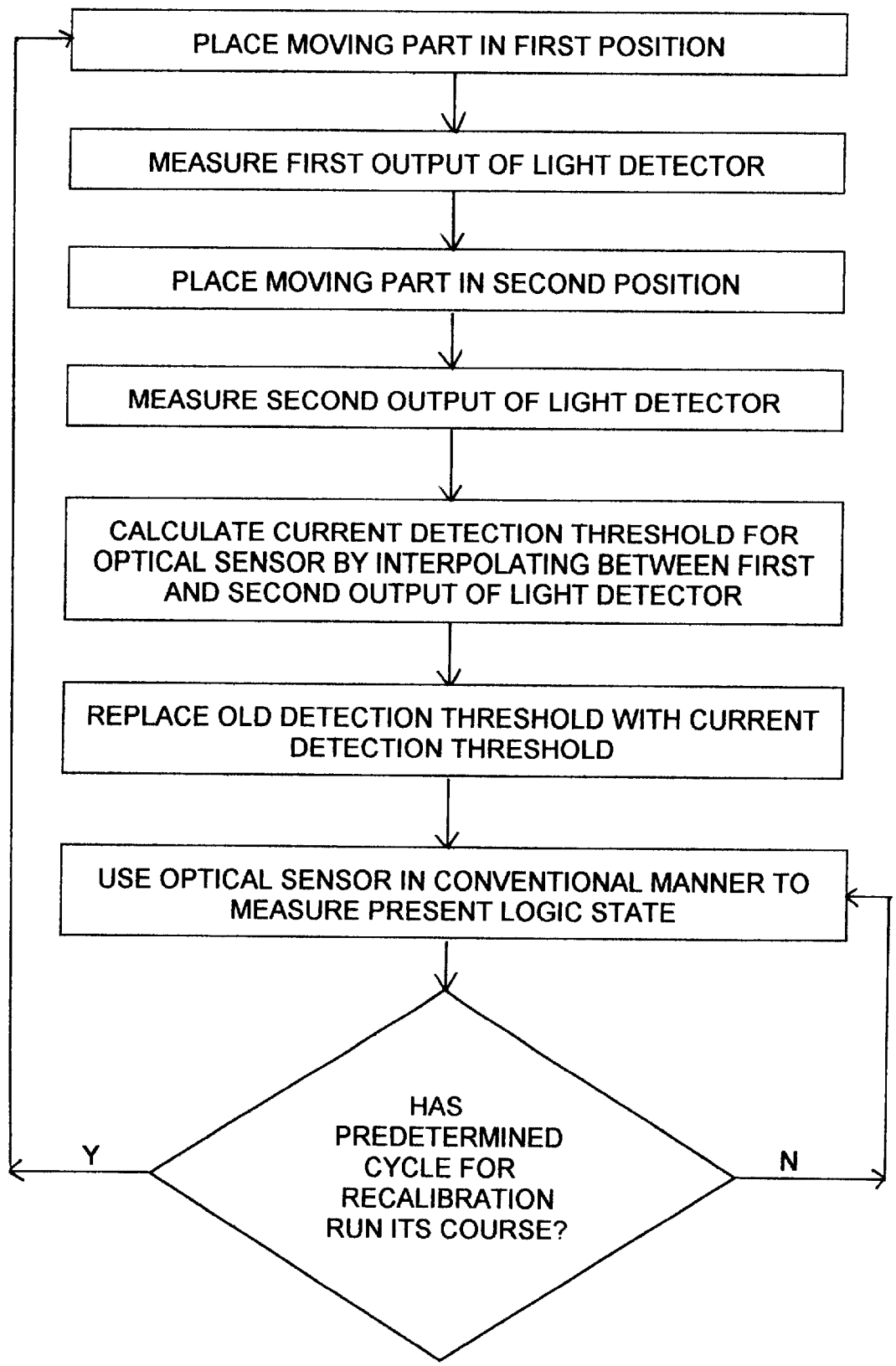
FIG. 9 is a block diagram of the steps involved in implementing the calibration procedure of the invention.

Specific examples of advantageous applications for the invention are automated systems that include cartridge-present sensors, door-open sensors, home-position sensors, or pivot-position sensors, such as found in conventional automated storage systems. For example, the gripper of a cartridge assembly could be moved to an extreme inward position and a voltage read from the light detector (unblocked optical path of the detector light producing maximum amplitude). The gripper motor would then be moved to the extreme outward position and the corresponding voltage read from the light detector to provide the minimum signal amplitude corresponding to the blocked position. These values would then be used to calculate a new detection threshold for the sensor. Similarly, the calibration of a door-open sensor could be performed by measuring the light-detector output when the door is open and closed. In all cases, the two sensor-output measurements needed to practice the invention correspond to the two conditions when the light beam is blocked and unblocked, for through-beam systems, and when the light beam is reflected and unreflected, for reflective systems. FIG. 9 illustrates the steps of the calibration process of the invention.

It is noted that the DAC implementation of the invention, when available, has the advantage of providing a digital logic output 24 that can be used directly to drive other circuits within the system, such as motors or other sensors. In the ADC implementation, the digital logic output is obtained only after processing by firmware.

Figure 10:
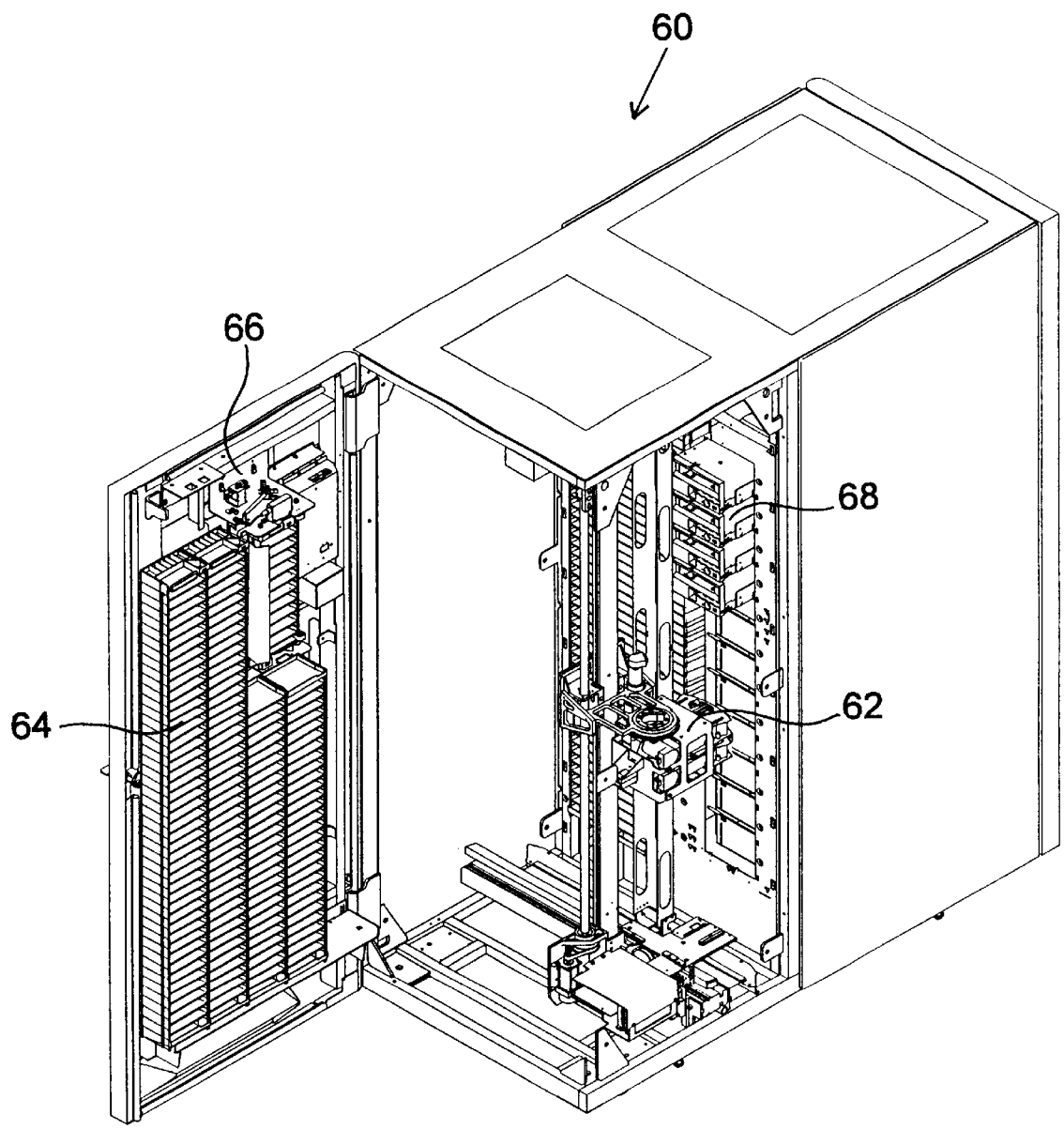
FIG. 10 is a perspective view of a tape library incorporating the optical sensor of the invention in a conventional cartridge gripper assembly.
Figure 11:
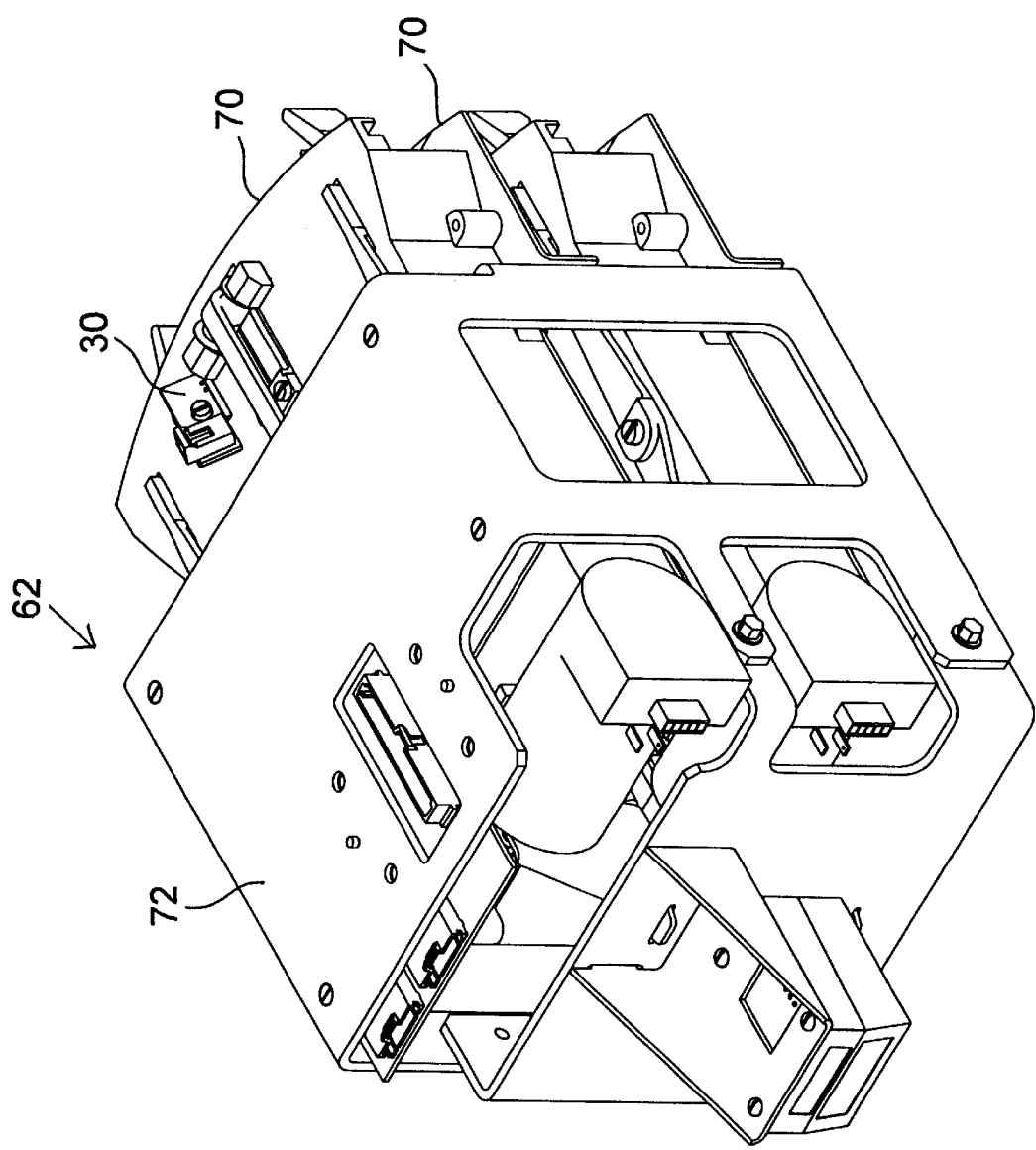
FIG. 11 is an isolated view of a dual gripper assembly utilized in the library of FIG. 10.
Figure 12:
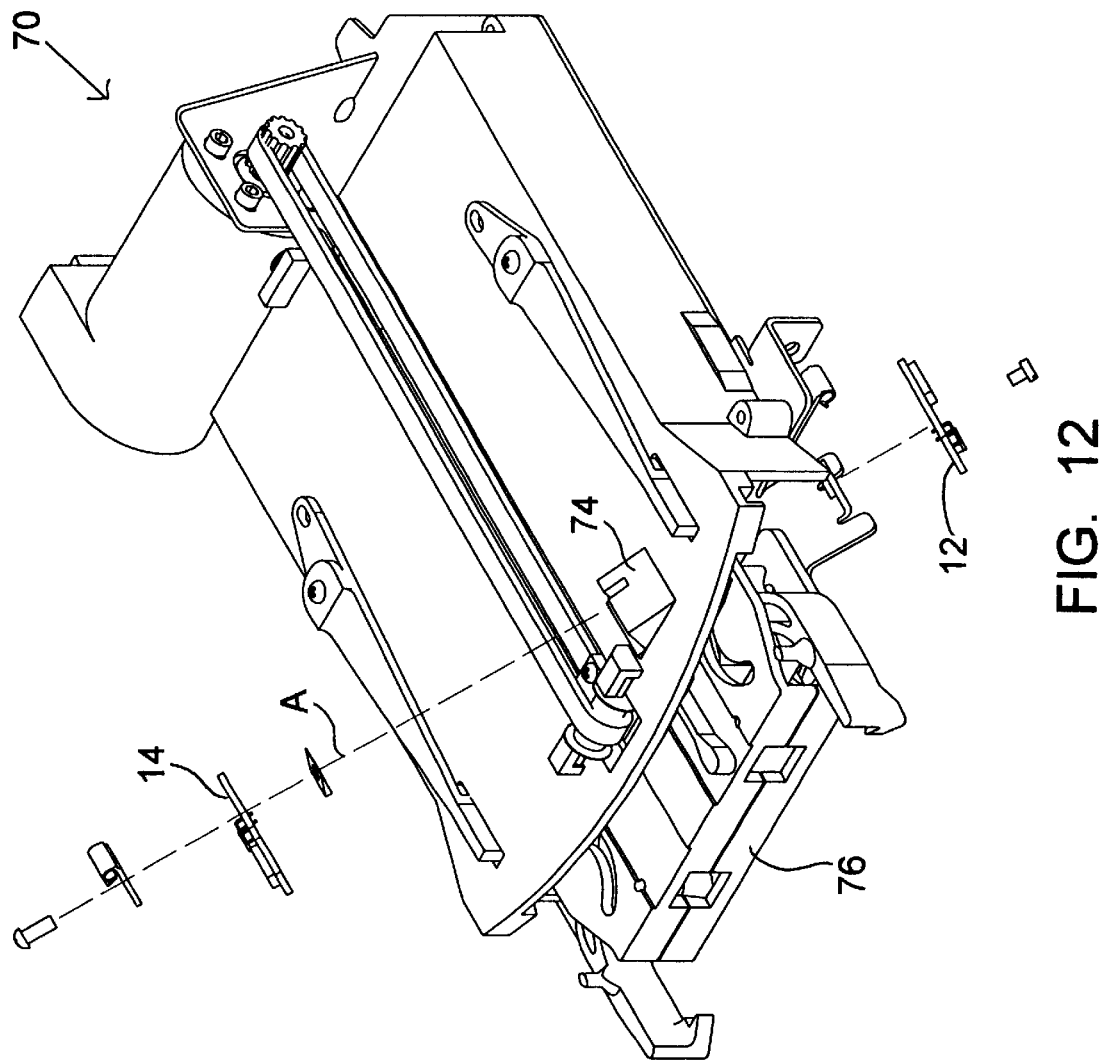
FIG. 12 is an exploded view of a portion of the gripper assembly of FIG. 11, turned around for clarity of illustration, showing the use of the sensor of the invention in a conventional library.

FIG. 10 illustrates the use of the optical sensor of the invention in a conventional tape library 60. A dual gripper assembly 62 is adapted for X, Y, Z and rotational movement in order to transfer tapes between storage cells 64 and the input/output station 66 or tape drives 68. FIG. 11 shows the dual gripper assembly 62 in isolation, illustrating two gripper units 70 housed in a common cage 72. As seen more clearly in the partially exploded and rotated view of FIG. 12, each gripper unit 70 is equipped with an optical sensor 30 according to the invention. The light source 12 of the sensor is mounted on one side of the gripper unit 70 in optical alignment along an axis A with a corresponding light detector 14 that is clamped on a block 74 on the other side of the unit, across from the path traveled by a tape cartridge (not present in the illustration) being handled by the gripper. Appropriate fastening and aligning hardware is also shown in the figure. Thus, when a tape cartridge is present in the unit 70, the light beam between the source 12 and the detector 14 is interrupted and a corresponding signal 16 is provided to indicate the analog state of the sensor, as described above. When the gripper finger assembly 76 is retracted with no cartridge present, the cartridge-present sensor 30 is unblocked. When the gripper finger assembly is extended, the cartridge-present sensor is blocked by the assembly 76. Thus, the sensor 30 may be calibrated without reference to the presence or absence of a cartridge within the assembly 76.

As one skilled in the art would readily understand, the invention has been described in terms of firmware, but it could be carried out in equivalent fashion using any code or logic implemented in hardware (such as an integrated circuit chip, a Field Programmable Gate Array, or an Application Specific Integrated Circuit) or in a computer readable medium (such as magnetic storage medium, optical storage, and volatile or non-volatile memory devices). Code in the computer readable medium may be accessed and executed by a processor through transmission media or from a file server over a network.

Various changes in the details, steps and components that have been described may be made by those skilled in the art within the principles and scope of the invention herein illustrated and defined in the appended claims. Therefore, while the invention has been shown and described in what is believed to be the most practical and preferred embodiments, it is recognized that departures may be made therefrom within the scope of the invention, which is not to be limited to the details disclosed herein but is to be accorded the full scope of the claims so as to embrace any and all equivalent processes and products.

We claim:

1. Apparatus for dynamically updating a detection threshold for an optical sensor adapted to compare a light-detector output with said detection threshold to determine a logic signal indicative of a first state, wherein a high light intensity is sensed by a light detector, and a second state, wherein a low light intensity is sensed by the light detector, said apparatus comprising:

a first part of an electronic circuit programmed to record a first output of said light detector when the high light intensity is sensed by the light detector and a second output of the light detector when the low light intensity is sensed by the light detector; and a second part of the electronic circuit programmed to update the detection threshold as a function of said first and second outputs of the light detector;

wherein said first and second outputs of the light detector correspond to maximum and minimum light intensities sensed by the light detector.

2. The apparatus of claim 1, wherein said first part of an electronic circuit includes an analog-to-digital converter adapted to produce a digital signal corresponding to said light-detector output, and a microprocessor adapted to record first and second digital signals corresponding to said first and second outputs of the light detector.

3. The apparatus of claim 2, wherein said analog-to-digital converter is embedded within a robotic system utilizing the optical sensor.

4. The apparatus of claim 1, wherein said first part of an electronic circuit includes a microprocessor and a digital-to-analog converter adapted to produce a range of analog signals spanning through said first and second outputs of the light detector, a comparator adapted to compare said analog signals with said light-detector output and produce a corresponding logic state signal, and a feedback loop connecting the comparator to the microprocessor.

5. The apparatus of claim 4, wherein said digital-to-analog converter is embedded within a robotic system utilizing the optical sensor.

6. The apparatus of claim 1, wherein said function of said first and second outputs of the light detector consists of an interpolation therebetween.

7. The apparatus of claim 6, wherein said interpolation is halfway between the first and second outputs of the light detector.

8. Apparatus for dynamically updating a detection threshold for an optical sensor adapted to compare a light-detector output with said detection threshold to determine a logic signal indicative of a first state, wherein a high light intensity is sensed by a light detector, and a second state, wherein a low light intensity is sensed by the light detector, said apparatus comprising:

means for recording a first output of said light detector when the high light intensity is sensed by the light detector and a second output of the light detector when the low light intensity is sensed by the light detector; and means for updating the detection threshold as a function of said first and second outputs of the light detector;

wherein said first and second outputs of the light detector correspond to maximum and minimum light intensities sensed by the light detector.

9. The apparatus of claim 8, wherein said recording means includes an analog-to-digital converter adapted to produce a digital signal corresponding to said light-detector output, and a microprocessor adapted to record first and second digital signals corresponding to said first and second outputs of the light detector.

10. The apparatus of claim 8, wherein said updating means includes a microprocessor.

11. The apparatus of claim 9, wherein said analog-to-digital converter is embedded within a robotic system utilizing the optical sensor.

12. The apparatus of claim 8, wherein said recording means includes a microprocessor and a digital-to-analog converter adapted to produce a range of analog signals spanning through said first and second outputs of the light detector, a comparator adapted to compare said analog signals with said light-detector output and produce a corresponding logic state signal, and a feedback loop connecting the comparator to the microprocessor.

13. The apparatus of claim 12, wherein said digital-to-analog converter is embedded within a robotic system utilizing the optical sensor.

14. A robotic system comprising;
   an optical sensor adapted to compare a light-detector output with a detection threshold to determine a logic signal indicative of a first state, wherein a high light intensity is sensed by a light detector, and a second state, wherein a low light intensity is sensed by the light detector:
   a first part of an electronic circuit programmed to record a first output of said light detector when the high light intensity is sensed by the light detector and a second output of the light detector when the low light intensity is sensed by the light detector; and
   a second part of the electronic circuit programmed to update the detection threshold as a function of said first and second outputs of the light detector;
   wherein said first and second outputs of the light detector correspond to maximum and minimum light intensities sensed by the light detector.

15. The robotic system of claim 14, wherein said first part of an electronic circuit includes an analog-to-digital converter adapted to produce a digital signal corresponding to said light-detector output, and a microprocessor adapted to record first and second digital signals corresponding to said first and second outputs of the light detector.

16. The robotic system of claim 14, wherein said first part of an electronic circuit includes a microprocessor and a digital-to-analog converter adapted to produce a range of analog signals spanning through said first and second outputs of the light detector, a comparator adapted to compare said analog signals with said light-detector output and produce a corresponding logic state signal, and a feedback loop connecting the comparator to the microprocessor.

17. A tape library comprising:
   an optical sensor adapted to compare a light-detector output with a detection threshold to determine a logic signal indicative of a first state, wherein a high light intensity is sensed by a light detector, and a second state, wherein a low light intensity is sensed by the light detector:
   a first part of an electronic circuit programmed to record a first output of said light detector when the high light intensity is sensed by the light detector and a second output of the light detector when the low light intensity is sensed by the light detector; and
   a second part of the electronic circuit programmed to update the detection threshold as a function of said first and second outputs of the light detector;
   wherein said first and second outputs of the light detector correspond to maximum and minimum light intensities sensed by the light detector.

18. The tape library of claim 17, wherein said first part of an electronic circuit includes an analog-to-digital converter adapted to produce a digital signal corresponding to said light-detector output, and a microprocessor adapted to record first and second digital signals corresponding to said first and second outputs of the light detector.

19. The tape library of claim 17, wherein said first part of an electronic circuit includes a microprocessor and a digital-to-analog converter adapted to produce a range of analog signals spanning through said first and second outputs of the light detector, a comparator adapted to compare said analog signals with said light-detector output and produce a corresponding logic state signal, and a feedback loop connecting the comparator to the microprocessor.

20. A method for dynamically updating a detection threshold for an optical sensor adapted to compare a light-detector output with said detection threshold to determine a logic signal indicative of a first state, wherein a high light intensity is sensed by a light detector, and a second state, wherein a low light intensity is sensed by the light detector, said method comprising the following steps:
   recording a first output of said light detector when the high light intensity is sensed by the light detector and a second output of the light detector when the low light intensity is sensed by the light detector; and
   updating the detection threshold as a function of said first and second outputs of the light detector;
   wherein said first and second outputs of the light detector correspond to maximum and minimum light intensities sensed by the light detector.

21. The method of claim 20, wherein said function of the first and second outputs of the light detector consists of an interpolation therebetween.

22. The method of claim 20, wherein said recording step is carried out by producing a digital signal corresponding to said light-detector output with an analog-to-digital converter, and by recording with a microprocessor first and second digital signals corresponding to said first and second outputs of the light detector.

23. The method of claim 20, wherein said updating step is carried out with a microprocessor.

24. The method of claim 22, wherein said updating step is carried out with said microprocessor.

25. The method of claim 20, wherein said recording step includes producing a range of analog signals spanning through said first and second outputs of the light detector using a microprocessor and a digital-to-analog converter, comparing said analog signals with said light-detector output and producing a corresponding logic state signal using a comparator, and feeding said logic state signal back to the microprocessor through a feedback loop.

26. The method of claim 25, wherein said updating step is carried out with said microprocessor.

27. The method of claim 21, wherein said interpolation is carried out by selecting a value halfway between the first and second outputs of the light detector.

* * * * *